United States Patent
Ogino et al.

(10) Patent No.: US 9,624,950 B2
(45) Date of Patent: Apr. 18, 2017

(54) BOOT BAND

(75) Inventors: Takashi Ogino, Yokohama (JP);
Hiroshi Ikeda, Aiko-gun (JP)

(73) Assignee: NHK SPRING CO., LTD., Yokohama (JP)

( * ) Notice: Subject to any disclaimer, the term of this patent is extended or adjusted under 35 U.S.C. 154(b) by 268 days.

(21) Appl. No.: 14/129,371

(22) PCT Filed: May 31, 2012

(86) PCT No.: PCT/JP2012/064218
§ 371 (c)(1),
(2), (4) Date: Mar. 31, 2014

(87) PCT Pub. No.: WO2013/001981
PCT Pub. Date: Jan. 3, 2013

(65) Prior Publication Data
US 2014/0201955 A1    Jul. 24, 2014

(30) Foreign Application Priority Data

Jun. 28, 2011   (JP) ................................ 2011-142690

(51) Int. Cl.
*F16B 2/08*   (2006.01)
*F16J 3/04*   (2006.01)
*F16D 3/223*  (2011.01)

(52) U.S. Cl.
CPC ................. *F16B 2/08* (2013.01); *F16J 3/042* (2013.01); *F16D 2003/22316* (2013.01); *Y10T 24/14* (2015.01)

(58) Field of Classification Search
CPC .... F16B 2/08; Y10T 24/1467; Y10T 24/1469; Y10T 24/1457; Y10T 24/1478; Y10T 24/148; Y10T 24/14; F16J 3/042; F16D 2003/22316
See application file for complete search history.

(56) References Cited

U.S. PATENT DOCUMENTS

| 4,517,708 A | 5/1985 | Calmettes et al. |
| 4,914,788 A | 4/1990 | Ojima |
| 6,178,601 B1 | 1/2001 | Craig, Jr. |

(Continued)

FOREIGN PATENT DOCUMENTS

| JP | 3-55873 | 6/1991 |
| JP | 05-010312 | 1/1993 |
| JP | 11-037367 | 2/1999 |
| JP | 11-223287 | 8/1999 |
| JP | 4744640 | 8/2011 |
| WO | 2009/152832 | 12/2009 |

OTHER PUBLICATIONS

Japanese Office Action from Corresponding Japanese Patent Application No. 2013-522551, mailed Sep. 15, 2015.

*Primary Examiner* — Robert J Sandy
*Assistant Examiner* — Michael Lee
(74) *Attorney, Agent, or Firm* — Greer, Burns & Crain, Ltd.

(57) ABSTRACT

Provided is a boot band that is configured for preventing the occurrence of buckling in the inner-layer portion of a band body. In the boot band, by applying a diameter-reducing tightening force on the band body when an engagement pawl of an inner-layer portion of the band body has entered a top-end engagement hole of an outer-layer portion of the band body, the top-end engagement hole rides over the engagement pawl. Buckling is prevented by providing, at the area of the top-end engagement hole opposite where the engagement pawl enters therein, a guide that faces the engagement pawl.

4 Claims, 6 Drawing Sheets

(56) References Cited

U.S. PATENT DOCUMENTS

| | | |
|---|---|---|
| 7,424,769 B2 | 9/2008 | Ogino et al. |
| 2006/0123604 A1 | 6/2006 | Ogino |
| 2009/0049655 A1 | 2/2009 | Ikeda et al. |
| 2011/0173779 A1 | 7/2011 | Meier et al. |

BOOT BAND

TECHNICAL FIELD

This invention relates to a boot band for clamping a member, such as a boot made of rubber, resin, or the like, and for fixing that member on another member.

BACKGROUND

A boot band is used, for example, as a constant-velocity joint that transmits the drive power of an engine from a drive shaft to a driven shaft. In a constant-velocity joint, a drive-power transmission portion is covered by a bellows-like boot, and grease is retained inside the boot. A boot band is wound around the outer periphery of both ends of the boot and is reduced in diameter, whereby the boot band clamps the boot so as to prevent the grease from leaking out of the boot. A pair of boot-band pawls are provided on such a boot band so that a clamping tool can be hooked onto the boot-band pawls to clamp the boot band, whereby clamping force is applied via the pair of the boot-band pawls in the direction to reduce the diameter of the boot band.

FIG. 12 shows a prior-art boot band 1. The boot band 1 comprises a band body 3 made of a thin metallic plate. The boot band 1 is wound in a ring-like form so as to clamp a member, such as a boot, in such a way that the boot band is wrapped completely around that member. When the band body 3 is wound around that member, winding is done in such a way that the outer-layer portion of the band body 3 overlaps the inner-layer portion of the band body 3. Thereby, the band body 3 has an outer-layer portion 4 and an inner-layer portion 5 that overlap each other.

As shown in FIG. 12(a), a first boot-band pawl 7 is formed on the top of the outer-layer portion 4 of the boot band 1, and a second boot-band pawl 6, which forms a pair with the first boot-band pawl 7, is formed on the inner-layer portion 5 of the boot band 1. These boot-band pawls 7, 6 are used for clamping the ring-like formed band body 3 in the diameter-reducing direction, and the claw portions of a clamping tool (not shown) are hooked onto those boot-band pawls 7, 6.

The second boot-band pawl 6 is press-molded so as to rise outward in the radial direction, and an opening 6b, which opens toward the first boot-band pawl 7, is formed in the second boot-band pawl 6, and the outer wall of the opening 6b forms a pressing part 6a. In addition, in the outer-layer portion 4, a portion that is closer to the top end (free end) of the outer-layer portion 4 of the boot band 1 than is the first boot-band pawl 7 serves as a terminal end 14 and extends in a flat form. This terminal end 14 is inserted into the second boot-band pawl 6 through the opening 6b. The terminal end 14 that is inserted into the opening 6b is pressed by the pressing part 6a so as to prevent the terminal end 14 from lifting outward in a radial direction. Because the terminal end 14 at the top end of the outer-layer portion 4 is inserted into the second boot-band pawl 6 so that the top end (terminal end 14) of the outer-layer portion 4 is pressed by the pressing part 6a, it is not necessary to press the outer-layer portion 4 inward at the time of clamping. Therefore, clamping of the member to be clamped is done simply by clamping the boot band in the diameter-reducing direction. In other words, clamping is performed by one action, which improves clamping workability. Patent Document 1 (Japanese Patent No. 4403728) discloses a boot band in which, as is the case with the boot band of FIG. 12, the second boot-band pawl presses the terminal end provided at the top end of the outer-layer portion, so that clamping is performed by one action.

In the prior-art boot band, as shown in FIG. 12(a), multiple engagement holes 12, 13 are formed in the lengthwise direction in the outer-layer portion 4, and an engagement pawl 11 that engages with either of the engagement holes 12, 13 is formed in the inner-layer portion 5 of the boot band 1. The engagement pawl 11 rises in a slope-like form facing the top end of the outer-layer portion 4 of the boot band 1. FIG. 12(a) shows a band body 3 in a ring-like form in a temporarily-locked condition. In this temporarily-locked condition, the engagement pawl 11 engages with a top-end engagement hole 12 located at the top of the outer-layer portion 4. Under this condition, applying a clamping force F (see FIG. 12(b)) to the band body 3 in the diameter-reducing direction causes the top-end engagement hole 12 to be moved over the engagement pawl 11, and then the engagement hole 13, which is behind the top-end engagement hole 12, engages with the engagement pawl 11. Due to this engagement, the band body 3 maintains a diameter-reduced condition whereby the diameter of the boot band is reduced and the member to be clamped is clamped.

The above-mentioned prior-art boot band 1 has a problem that the inner-layer portion 5 of the boot band 1 might buckle when the band body 3 is clamped. How such buckling can occur will now be described with reference to FIG. 12.

FIG. 12(a) shows a state where the engagement pawl 11 is engaged with the top-end engagement hole 12, so that the band body 3 is in a temporarily-locked condition in a ring-like form. Under this condition, when a clamping tool is used to apply clamping force F to the band body 3 in the diameter-reducing direction, the top-end engagement hole 12 slides on the back face 11a of the engagement pawl 11 and climbs over the engagement pawl 11, as shown in FIG. 12(b). At the time of this moving-over, the rear of the top-end engagement hole 12 in the outer-layer portion 4 gets stuck with the back face 11a of the engagement pawl 11, as a result of which the sliding of the top-end engagement hole 12 is stopped and locked.

Because the sliding is stopped, a load that should have been used for reducing the diameter of the band body 3 is applied to the portion between the engagement pawl 11 and the second boot-band pawl 6 in the inner-layer portion 5. Under this condition where the sliding of the top-end engagement hole 12 is stopped and locked, even when a clamping force F is applied to the band body 3, the condition becomes the same as that when the load of the clamping force F is received by the inner-layer portion 5 between the engagement pawl 11 and the second boot-band pawl 6 in the inner-layer portion 5. When the clamping load on the band body 3 exceeds the buckling-resistance capability of the band body 3, resulting in an overload state, buckling 16 occurs in the inner-layer portion 5 between the engagement pawl 11 and the second boot-band pawl 6 in the inner-layer portion 5 (see FIG. 12(c)).

Patent Document 1 discloses a boot band having a structure in which the second boot-band pawl 6 presses the terminal end provided at the top end of the outer-layer portion 4 so that clamping is performed by one action (as is the case with the boot band of FIG. 12), thereby preventing the aforementioned occurrence of buckling in the inner-layer portion 5. In the invention of Patent Document 1, a slit or the like is provided between the top-end engagement hole 12 and the first boot-band pawl 7 in the outer-layer portion 4, so that the rigidity of the outer-layer portion 4 between the top-end engagement hole 12 and the first boot-band pawl 7 is reduced. As a result of this reduction of the rigidity, when the band body is clamped the outer-layer portion 4 is allowed to slide so as to press the portion between the engagement pawl 11 and the second boot-band pawl 6 in the inner-layer portion 5; in addition, the load by which the outer-layer portion 4 presses the back face 11a of the engagement pawl 11 toward the center of the ring-like form is reduced, thereby preventing buckling 16 of the area between the engagement pawl 11 and the second boot-band pawl 6 in the inner-layer portion 5.

Also, Patent Document 1 discloses that a rib or the like is formed between the second boot-band pawl 6 and the engagement pawl 11 in the inner-layer portion 5, so that the rigidity of the inner-layer portion 5 between the second boot-band pawl 6 and the engagement pawl 11 is increased so as to increase the buckling-resistance capability of the boot band, thereby preventing buckling at the portion of the inner-layer portion 5 between the engagement pawl 11 and the second boot-band pawl 6 in the inner-layer portion 5.

PRIOR-ART DOCUMENT

Patent Document

Patent Document 1: Japanese Patent No. 4403728

SUMMARY

Technical Problems

For a boot used as a member to be clamped, a boot made of rubber can be used instead of a boot made of a hard resin. Because a boot made of rubber is softer than a boot made of hard resin, a boot band used for clamping a boot made of rubber can be thinner and narrower than a boot band used for clamping a boot made of hard resin, so that the area of the cross-section of the boot band can be made smaller than that of a boot band used for clamping a boot made of hard resin. Therefore, a boot band used for a boot made of rubber has an advantage in that it can be made lighter than a boot band used for clamping a boot made of hard resin. However, the rigidity of a boot band used for a boot made of rubber is low despite its advantage of being thin, and accordingly the buckling-resistance capability of the boot band at the time of clamping becomes reduced. In such a case, even if the boot band has a structure so as to prevent buckling as disclosed in Patent Document 1, the buckling-resistance capability is not sufficiently strong, and hence buckling is not prevented. Thus, there is an increasing requirement for a boot band having a structure that prevents buckling even when the boot band is thin.

The present invention has been made in consideration of the above-mentioned problems of prior-art boot bands. One objective of this invention is to provide a boot band that has a structure such that clamping is performed by one action, as is disclosed in Patent Document 1, and that further has a feature that even if the boot band is made to be thin and/or narrow, buckling is prevented.

Solution to the Problem

A boot band of the present invention includes (1) a band body that is wound in a ring-like form for clamping around a member to be clamped, in such a way that the outer-layer portion of the band body overlaps the inner-layer portion of the band body; (2) a first boot-band pawl that is formed on the top of the outer-layer portion of the band body; (3) a planar terminal end that is formed in the outer-layer portion of the band body, and that is located nearer to the top end of the outer-layer portion than the first boot-band pawl is; (4) a second boot-band pawl that is formed in the inner-layer portion of the band body, which has (a) an opening into which the aforementioned terminal end can be inserted, (b) a pressing part that presses, from the outside, with said terminal end that is inserted into the opening, and that clamps the band body together with the first boot-band pawl so that the band body is reduced in diameter; (5) multiple engagement holes formed in the lengthwise direction in the outer-layer portion of the band body; and (6) an engagement pawl that is formed on the inner-layer portion of the band body and that rises in a slope-like form facing the top end of the outer-layer portion of the band body; and in a state wherein the engagement pawl is inserted into a top-end engagement hole that is located at the top end of the outer-layer portion of the band body in the lengthwise direction, clamping force is applied to the band body in the diameter-reducing direction, so that the top-end engagement hole climbs over the engagement pawl, whereby a following engagement hole is engaged with the engagement pawl; and a guide means is provided at the back end of the top-end engagement hole and opposite the engagement pawl.

In such a case, it is preferable that (1) the guide means is an R part provided to a part of the back end of the top-end engagement hole, the R part facing the inner-layer portion of the band body; (2) the guide means has a sloping portion that meets the engagement pawl; (3) the guide means is a guide pawl that slopes upward from the back end of the top-end engagement hole in the direction in which the engagement pawl rises, and the sloping portion is provided to the surface of the guide pawl, with the surface being opposite the engagement pawl; (4) the guide means is on the inner surface of the back end of the top-end engagement hole, with the inner surface being opposite the engagement pawl, and the sloping portion extends to the inner surface of the back end of the top-end engagement hole; (5) the clamping force in the diameter-reducing direction allows the guide means to climb over the back face of the engagement pawl, and the slope of the back face of the engagement pawl is formed so as to include two stages of angles, an inclination angle $\beta$ at the beginning stage of the climbing over and an inclination angle $\alpha$ at the ending stage of the climbing over, with the relationship between $\beta$ and $\alpha$ being $\alpha<\beta$; and (6) the clamping force in the diameter-reducing direction allows the guide means to climb over the back face of the engagement pawl, and the slope of the back face of the engagement pawl is formed so as to include two stages of angles, an inclination angle $\beta$ at the beginning stage of the climbing over and an inclination angle $\alpha$ at the ending stage of the climbing over, and wherein the slope of the guide means has an inclination angle $\gamma$, with the relationship between the angles $\alpha$, $\beta$, and $\gamma$ being $\alpha<\beta<\gamma$.

Advantageous Effects of the Invention

In the present invention, a guide means is provided to the area in the top-end engagement hole into which the engagement pawl is inserted, with the area being opposite the engagement pawl, and therefore when the band body is clamped, the outer-layer portion does not get stuck with the engagement pawl. Accordingly, the resistance that occurs when the outer-layer portion of the band body climbs over the back face of the engagement pawl is decreased, whereby the outer-layer portion can smoothly move and climb over the engagement pawl. Thus, overload is not applied to the inner-layer portion of the band body, and accordingly, even if the band body is made to be thinner, buckling of the area between the engagement pawl and the second boot-band pawl in the inner-layer portion of the band body is prevented.

BRIEF DESCRIPTIONS OF THE DRAWINGS

FIG. 5(a), FIG. 5(b), FIG. 5(c), and FIG. 5(d) show sectional views illustrating the clamping operation of the boot band according to Embodiment 1.

Figure 6:
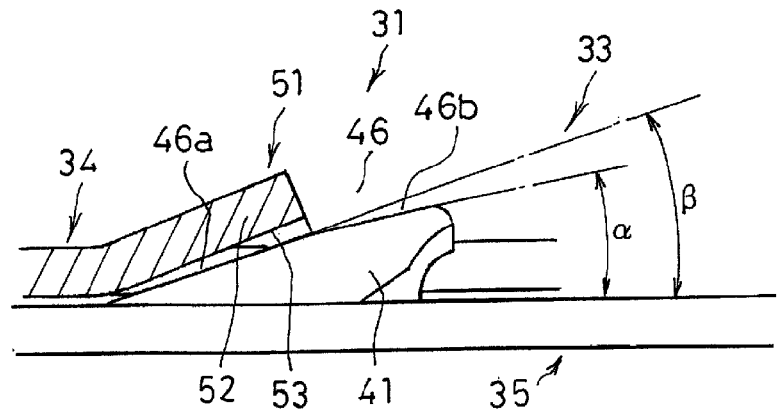

FIG. 6 is a fragmentary sectional view showing the state in which two-stage slopes are provided at the back face of an engagement pawl.

Figure 7:
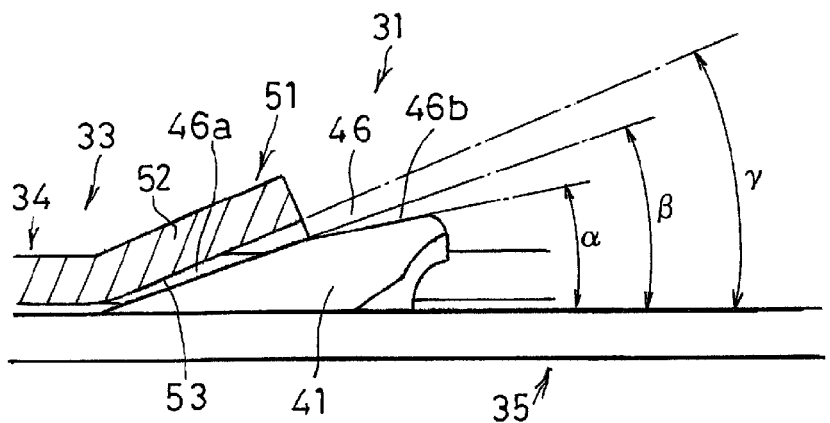

FIG. 7 is a fragmentary sectional view showing (1) the state in which two-stage slopes are provided at the back face of an engagement pawl, and (2) the relationship between the angles of those slopes and the angle of the guide means.

Figure 8:
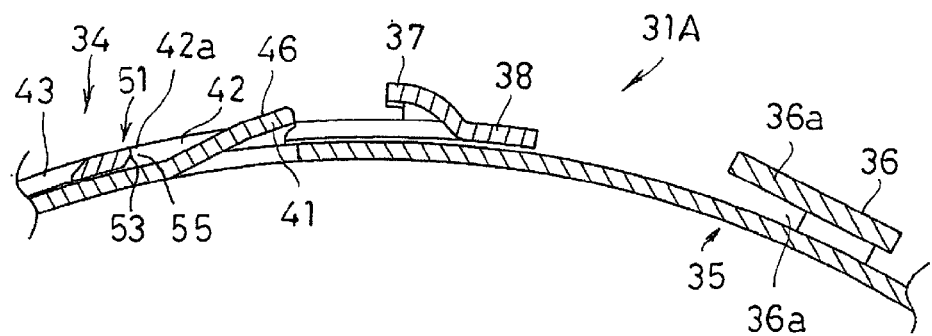

FIG. 8 is a fragmentary sectional view of the boot band according to Embodiment 2 of the present invention.

Figure 9:
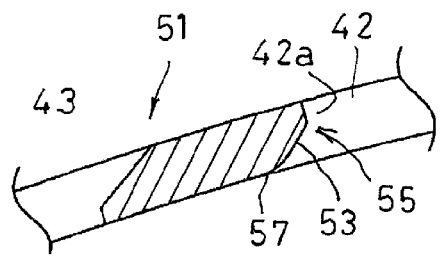

FIG. 9 is an enlarged cross-sectional view showing the main part of the boot band shown in FIG. 7.

Figure 10:
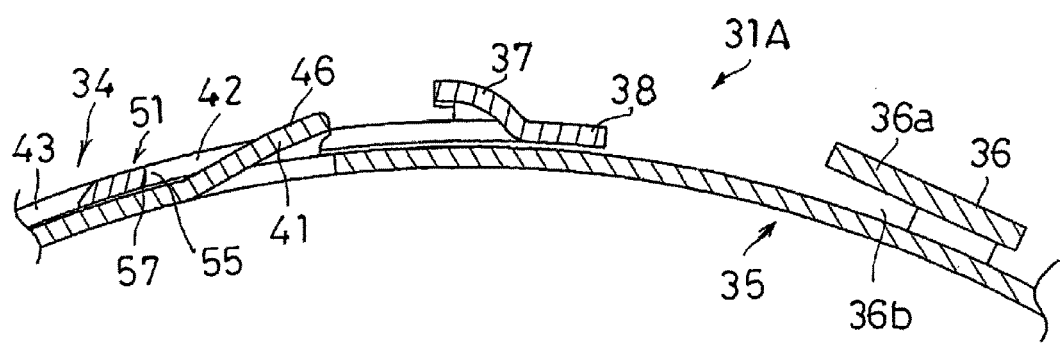

FIG. 10 is a fragmentary sectional view of the boot band according to a modified version of Embodiment 2.

Figure 11:
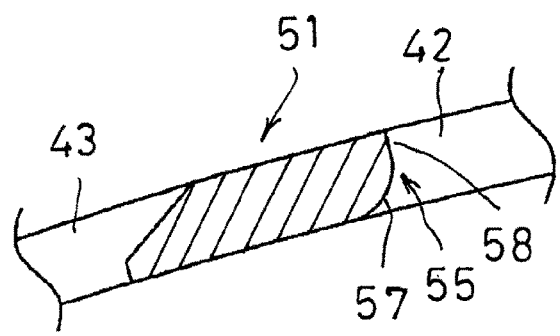

FIG. 11 is an enlarged cross-sectional view showing the main part of the boot band shown in FIG. 10.

Figure 12A:
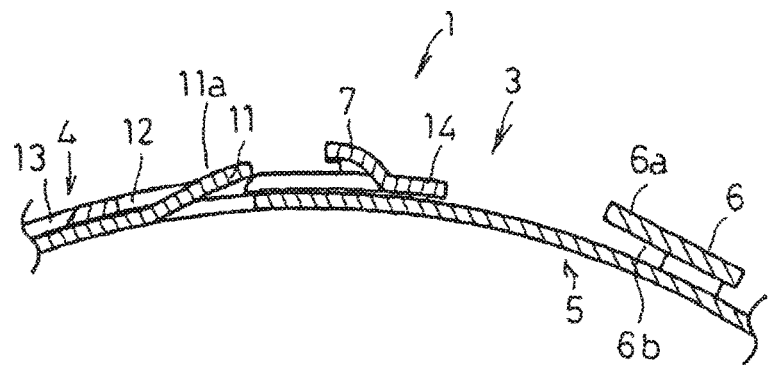
Figure 12B:
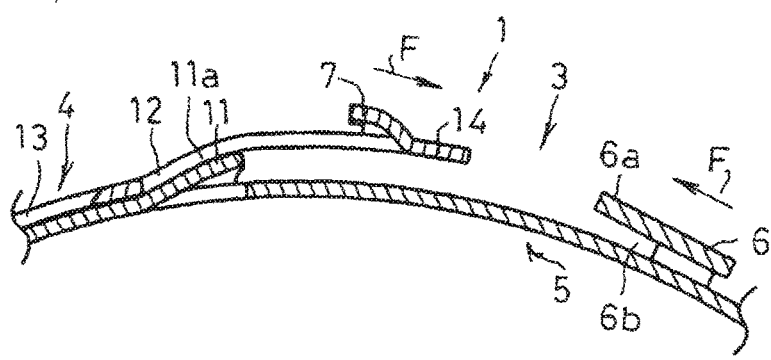
Figure 12C:
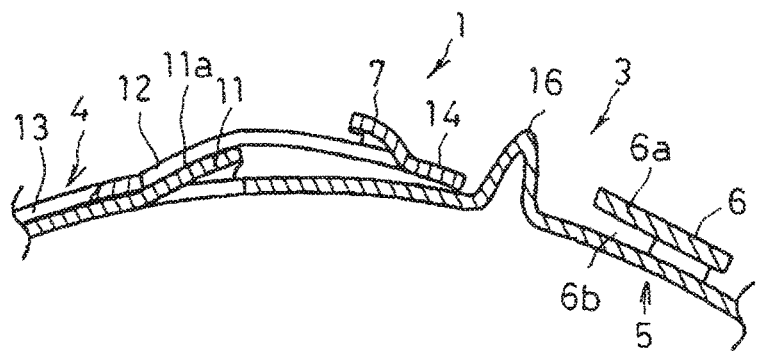

FIG. 12(a) is a fragmentary sectional view showing a prior-art boot band, and FIG. 12(b) and FIG. 12(c) are fragmentary sectional views showing the clamping operations of the prior-art boot band.

DETAILED DESCRIPTION

The present invention will now be explained in detail, with reference to the drawings showing the embodiments.
Embodiment 1

Figure 1:
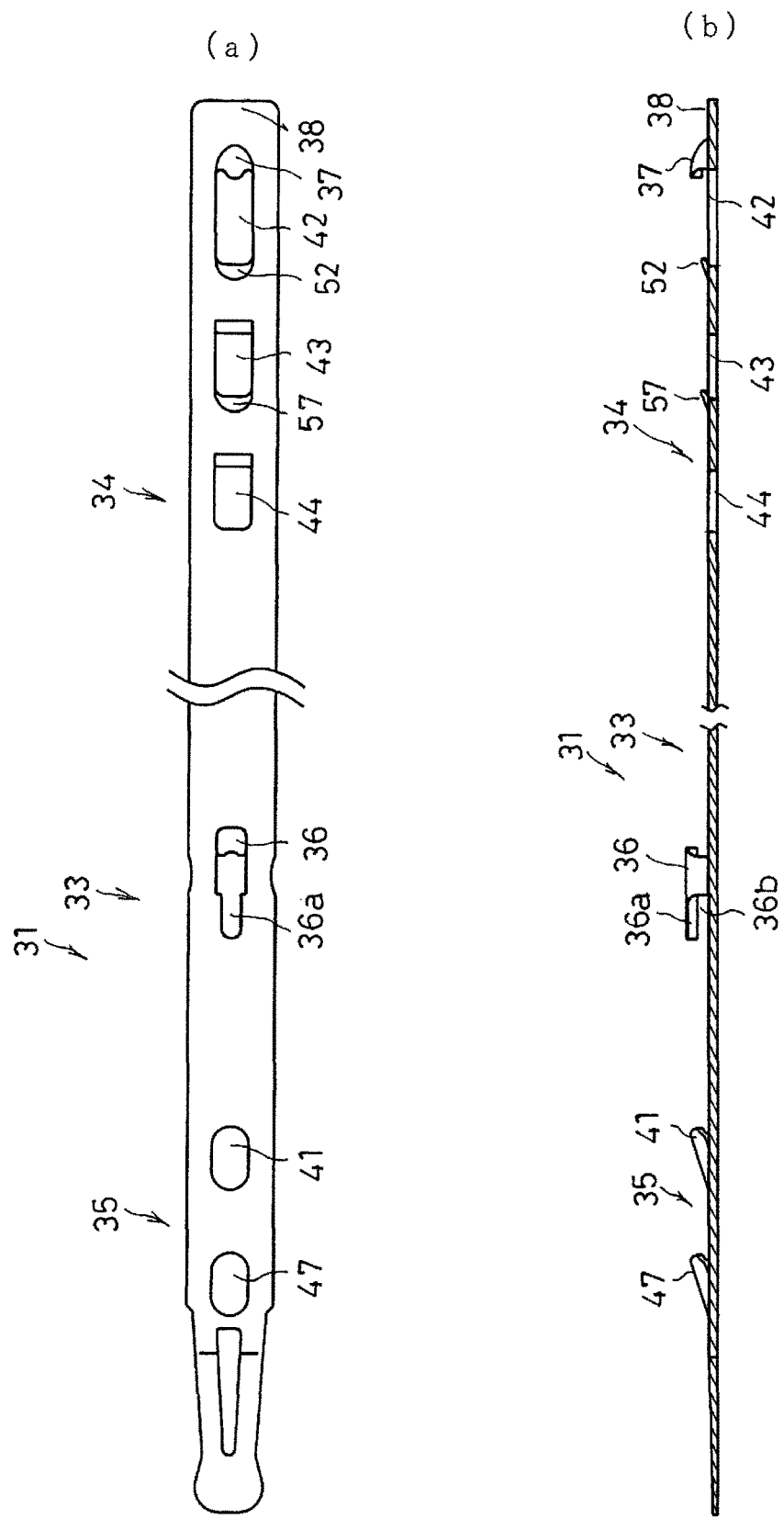
FIG. 1(a) is a plan view.
FIG. 1(b) is a cross-sectional view, respectively, of the boot band in Embodiment 1 of the present invention.
Figure 2:
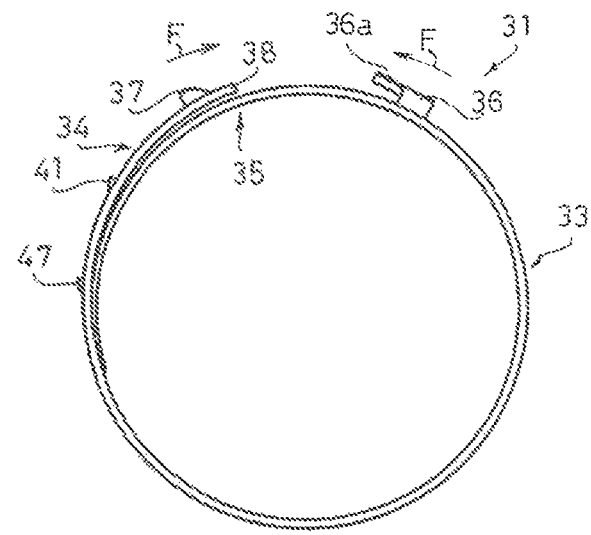
FIG. 2 is an elevation view showing the boot band wound in a ring-like form.
Figure 3:
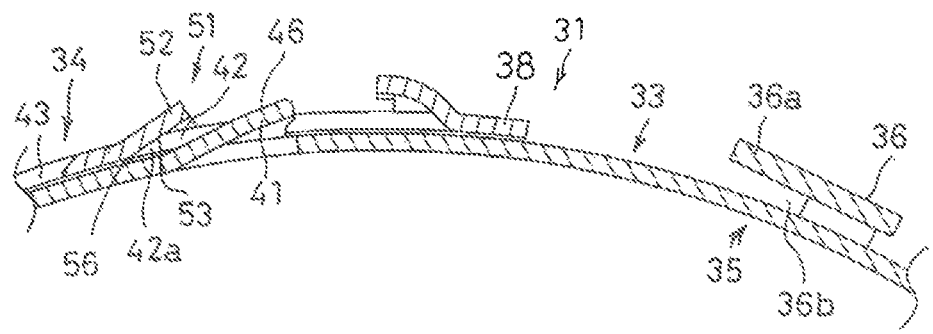
FIG. 3 is a cross-sectional view showing the main part of the boot band.

FIGS. 1-7 show Embodiment 1 of the present invention. As shown in FIGS. 1-3, a boot band 31 is formed by a band body 33 made of a thin metallic plate.

The band body 33 is formed by press-punching a thin metallic plate into the form of a belt that is used for clamping a member to be clamped (not shown) under the condition that the band body 33 in the shape of a belt is wound around the member to be clamped, such as a boot, so as to form a ring shape. The band body 33, which is wound like a ring, is formed with an outer-layer portion 34 that overlaps an inner-layer portion 35, and these outer-layer and inner-layer portions 34, 35 are pressed in the diameter-reducing direction (the directions of the arrows F in FIG. 2) so as to clamp the member to be clamped.

A first boot-band pawl 37 is formed on the top-end side (the right-end side in FIG. 1) of the outer-layer portion 34 of the band body 33 so as to rise outward in the radial direction. Also, a planar terminal end 38 is formed at the free end of the band body 33, and is located nearer to the top of the top-end side than the first boot-band pawl 37 is. The terminal end 38 is formed so as to face a second boot-band pawl 36, which will be described later.

A second boot-band pawl 36—which forms a pair with the first boot-band pawl 37—is formed on the inner-layer portion 35. The second boot-band pawl 36, which is formed so as to rise atop the inner-layer portion 35, has a pressing part 36a, as well as an opening 36b that faces the first boot-band pawl 37, so that the terminal end 38 of the outer-layer portion 34 can be inserted thereinto. The pressing part 36a covers the outside of the opening 36b in the circumferential direction, and acts so as to press the terminal end 38—which is inserted in the opening 36b—from the outside.

Thus, the terminal end 38 of the outer-layer portion 34 is pressed by the pressing part 36a of the second boot-band pawl 36 provided to the inner-layer portion 35, whereby the outer-layer portion 34 does not rise when the band body 33 is clamped, so that pressing the outer-layer portion 4 inward at the time of clamping is not necessary. Therefore, simply clamping in the diameter-reducing direction allows the clamping of the member to be clamped, so that clamping is performed by one action, and clamping workability is improved.

Figure 4:
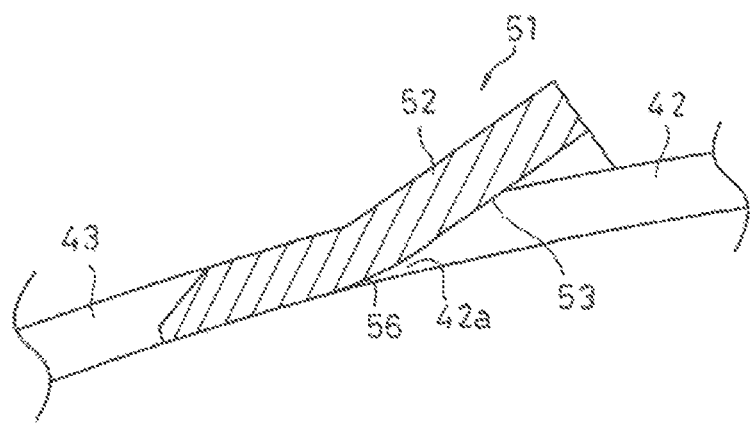
FIG. 4 is an enlarged cross-sectional view showing the guide means.

An engagement pawl 41 is formed so as to be raised by cutting and pressing on the inner-layer portion 35, sloping upward and facing the top end of the outer-layer portion 34 (the right-end side in FIGS. 3 and 4). This engagement pawl 41 is the engagement pawl that is formed on the inner-layer portion 35 so as to correspond to the top end of the outer-layer portion 34, and a second engagement pawl 47 is further formed at a predetermined distance to the rear of the engagement pawl 41 in the inner-layer portion 35 (the end being at a distance from the outer-layer portion 34). The second engagement pawl 47 is formed so as to slope upward and to face the top end of the outer-layer portion 34 (the right-end side in FIGS. 3 and 4), similar to the engagement pawl 41.

Multiple engagement holes 42, 43, and 44 are formed in the lengthwise direction on the outer-layer portion 34. The engagement hole 42 is located at the top far end of the outer-layer portion 34 (the right-end side in FIG. 1), whereby it becomes the top-end engagement hole 42. The engagement hole 43 is formed behind the top-end engagement hole 42, whereby it becomes the following engagement hole 43. The engagement pawl 41 of the inner-layer portion 35 is inserted into and engaged with the top-end engagement hole 42, so that the band body 33 is made to be in a temporarily-locked condition in a ring-like form. In addition, due to the clamping of the band body 33 in the diameter-reducing direction, the engagement pawl 41 moves from the top-end engagement hole 42 to the following engagement hole 43 and is engaged with the following engagement hole 43. Due to this engagement, the band body 33 retains a clamped condition in which the band body 33 clamps the member to be clamped. The engagement hole 44 is the third engagement hole, and it is formed further behind the following engagement hole 43. The second engagement pawl 47 is inserted into and engaged with the third engagement hole 44 when the band body 33 is clamped.

A guide means 51 is formed on the top-end engagement hole 42 of the boot band 31. In this embodiment, the guide means 51 is formed by a guide pawl 52 that rises from the back end 42a (the left-side end in FIGS. 3 and 4) of the top-end engagement hole 42.

As shown in FIGS. 3 and 4, the guide pawl 52 is formed by press molding or the like so as to slope upward from the back end (the left-side end) 42a of the top-end engagement hole 42 and to face the engagement pawl 41. Because the guide pawl 52 slopes upward, the lower surface of the guide pawl 52 is opposite the back face 46 of the engagement pawl 41 and is a sloping portion 53 inclining the same as the back face 46 of the engagement pawl 41. Also, the root portion, i.e., the rearmost end portion of the sloping portion 53 (the left end in FIGS. 3 and 4) has a smooth R part 56.

The R part 56 is formed at the back end 42a of the top-end engagement hole 42, on the part that faces the inner-layer portion 34, and the sloping portion 53 is continuously formed from this R part 56. The sloping portion 53 slopes upward starting from the R part 56 the same as the back face 46 of the engagement pawl 41. The sloping portion 53 smoothly extends over the back face of the engagement pawl 41 without getting stuck with the engagement pawl 41 when the clamping of the band body 33 in the diameter-reducing direction is achieved.

Further, in this embodiment, there is also formed on the rim of following engagement hole 43 a second guide pawl 57 (not shown) [Kyosei's Note: In this paragraph, the author of this specification has several times mistakenly used "57" to refer to the second guide pawl. However, in all other instances in this specification "57" is an R part, not a second guide pawl. Moreover, none of the figures show a second guide pawl.] that is shapes similar to the guide pawl 52 (see FIG. 1). The second guide pawl 57 corresponds to the second engagement pawl 47, and an R part 56 is formed on the lower surface of the second guide pawl 57, which slopes in the same direction as the lower surface of the second guide pawl 57 and is opposite to the back face of the second engagement pawl 47. Such a second guide pawl 57 smoothly extends over the back face of the second engagement pawl 47 starting from the temporarily-locked condition of the band body 33 when the band body 33 is clamped, and slides on the engagement pawl 47 without getting stuck with the engagement pawl 47. The band body 33 is thereby more smoothly reduced in diameter when it is clamped. In addition, if the operation made by the guide pawl 52 alone enables the band body 33 to be smoothly reduced in diameter, the second guide pawl 57 can be omitted.

Figure 5:
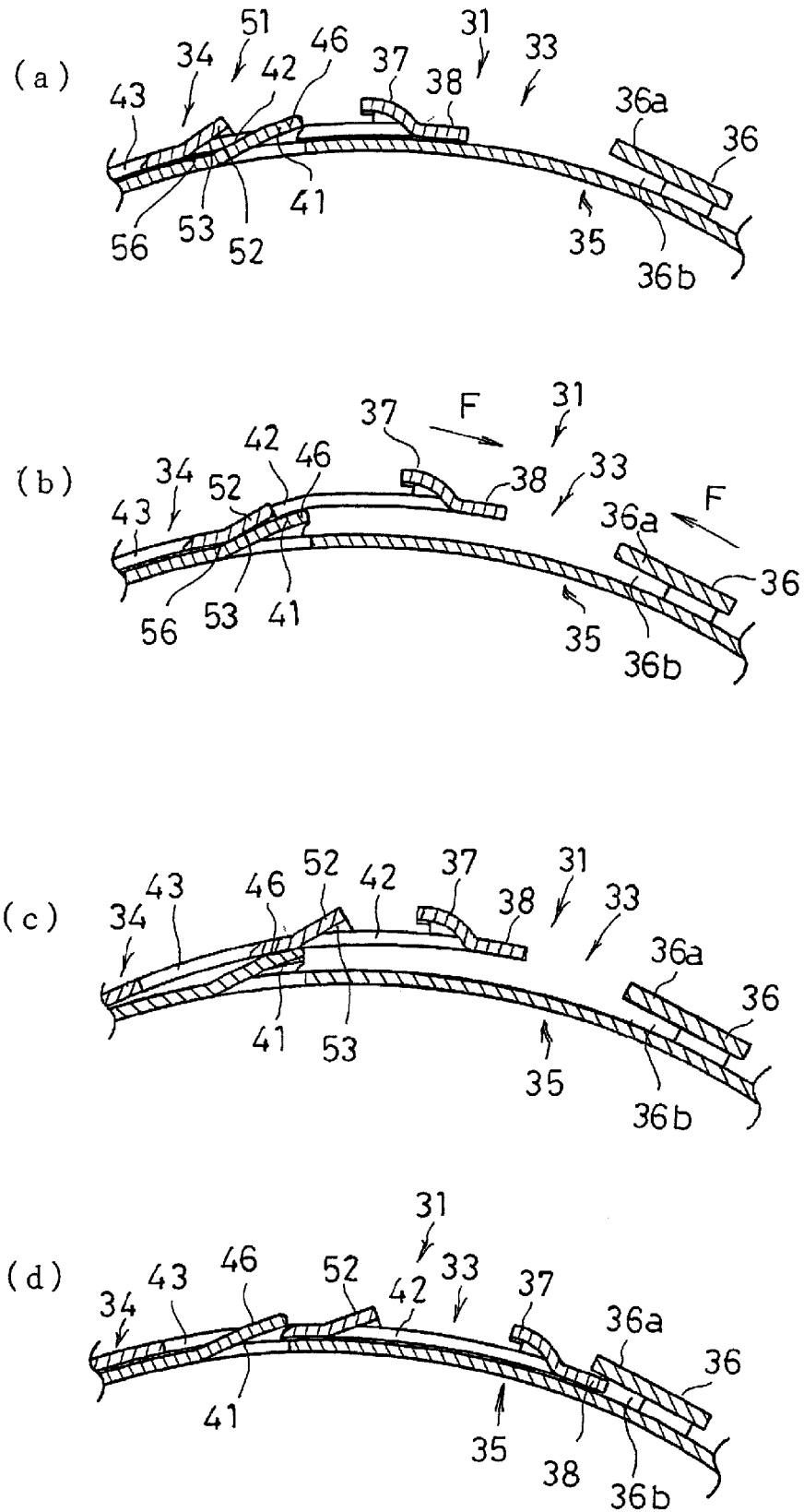

Next, the operation to clamp the boot band 31 in this embodiment will be described with reference to FIG. 5.

FIG. 5(a) shows a temporarily-locked condition of the band body 33 in a ring-like form. In this temporarily-locked condition, the engagement pawl 41 is inserted into and engaged with the top-end engagement hole 42, which enables the band body 33 to be kept in a ring-like form.

FIG. 5(b) shows the state in which the claws of a clamping tool are hooked onto a first boot-band pawl 37 and a second boot-band pawl 36 in the state shown in FIG. 5(a), so that a clamping force F is applied to the band body 33 in the diameter-reducing direction. Due to the clamping force F in the diameter-reducing direction, the top-end engagement hole 42 of the outer-layer portion 34 begins to climb over the engagement pawl 41. When the top-end engagement hole 42 climbs over the engagement pawl 41, the R part 56 at the root portion of the sloping portion 53 of the guide pawl 52 smoothly climbs over the back face 46 of the engagement pawl 41, whereby the top-end engagement hole 42 slides along the back face 46 of the engagement pawl 41. Accordingly, the resistance that occurs when the outer-layer portion 34, including the guide pawl 52, climbs over the back face 46 of the engagement pawl 41 is decreased, and friction does not occur between the outer-layer portion 34 and the guide pawl 52.

Thus, at the top-end engagement hole 42, the guide pawl 52 moves along the back face 46 of the engagement pawl 41 while the guide pawl 52 climbs over the back face 46, whereby the band body 33 is smoothly reduced in diameter.

FIG. 5(c) shows the state in which the band body 33 is further reduced in diameter from the state shown in FIG. 5(b). In this state, the sloping part 53 of the guide pawl 52 extends past the back face 46 of the engagement pawl 41, and the outer-layer portion 34 slides along the back face 46 of the engagement pawl 41, so that the sloping portion 53 of the guide pawl 52 is in the state just before extending over the back face 46. In the state of FIG. 5(c), the guide pawl 52 at the top-end engagement hole 42 slides along the back face 46 of the engagement pawl 41 while the guide pawl 52 smoothly climbs on and then slides on the back face 46 of the engagement pawl 41, and therefore the band body 33 is smoothly reduced in diameter.

Thus, in this embodiment, the sloping portion 53 smoothly extends over and slides along the back face 46 of the engagement pawl 41 and slides along the back face 46 of the engagement pawl 41, so that the top-end engagement hole 42 can climb over the engagement pawl 41. Due to this climbing over, the following engagement hole 43 that is behind the top-end engagement hole 42 moves toward the engagement pawl 41. Due to this movement, the engagement pawl 41 is inserted into and engaged with the following engagement hole 43 (FIG. 5(d)). Due to this engagement, the band body 33 keeps a clamping condition, by which the diameter of the band is reduced, being further clamped than when the band body 33 is in a ring like-form. In this clamping of the band body 33, the terminal end 38 of the outer-layer portion 34 is inserted into the opening 36b of the second boot-band pawl 36 and is pressed by the pressing part 36a, and therefore the outer-layer portion 34 does not rise outwardly. Accordingly, it is not necessary to press the outer-layer portion 34 inward at the time of clamping the band body, whereby clamping is performed by one action, and clamping workability is improved.

In such an embodiment, at the time of clamping the band body 33, the outer-layer portion 34 does not get stuck with the engagement pawl 41 while the top-end engagement hole 42 climbs over the back face 46 of the engagement pawl 41, and therefore the band body 33 is smoothly reduced in diameter. Therefore, overload is not applied to the area between the engagement pawl 41 and the second boot-band pawl 36 in the inner-layer portion 35, even if the band body 33 is made thinner.

FIG. 6 shows the structure of the back face 46 of the engagement pawl 41 according to this embodiment. In this embodiment, the slope of the back face 46 of the engagement pawl 41 has two stages, including a beginning-stage slope 46a at the beginning of the climbing over and an ending-stage slope 46b at the ending of the climbing over, after the beginning-stage slope 46a.

In addition, the relationship between the inclination angle β of the beginning-stage slope 46a (the angle at the beginning of the climbing over) and the inclination angle α of the ending-stage slope 46b (the angle at the ending of the climbing over) is set to be α<β. This enables the inclination angles α and β to be adapted according to the magnitude of the reaction force from the boot. That is, at the beginning of the clamping of the band body 33 shown in FIG. 5(b), the reaction force of a boot against the band body 33 is small, and therefore even if the angle β at the beginning of the climbing over is set large, applying an overload on the band body 33 does not affect the band body 33 much.

At the ending of the clamping of the band body 33 as shown in FIG. 5(c), the reaction force of a boot against the band body 33 increases, and therefore the angle α at the ending of the climbing over is smaller. Therefore, even if the force in the diameter-increasing direction is applied to the band body 33 due to the reaction force of a boot, and if the inner-layer portion 35 moves toward the outer-layer portion 34, the contact pressure between the back face 46 of the engagement pawl 41 and the guide pawl 52 can be reduced, so that the friction force generated between them is diminished. Accordingly, even at the ending of the clamping of the band body 33, in the state where the sloping portion 53 of the guide pawl 52 has climbed on the back face 46 of the engagement pawl 41, the sloping portion 53 can more smoothly slide on the back face 46 of the engagement pawl 41. Thus, the guide pawl 52 does not get stuck with the engagement pawl 41, and therefore overload resulting from sticking is not applied to the area between the engagement pawl 41 and the second boot-band pawl 36 in the inner-layer portion 35. Accordingly, the clamping of the band body 33 as shown in FIG. 5(a)-FIG. 5(d) is performed more smoothly, and thereby buckling is more surely prevented from occurring in the area between the engagement pawl 41 and the second boot-band pawl 36 in the inner-layer portion 35, even if the band body 33 is made thinner. In order to achieve the aforesaid clamping, the inclination angle α is set to about 12°, and the inclination angle β is set to about 19°.

FIG. 7 shows an embodiment in which the inclination angle of the sloping portion 53 in the guide pawl 52 is adjusted, in addition to adjusting the inclination angles for the back face 46 of the engagement pawl 41 as is shown in FIG. 6.

In FIG. 7, as is similar to FIG. 6, there are formed on the back face 46 of the engagement pawl 41a beginning-stage slope 46a inclined at an angle β at the beginning of the climbing over, and an ending-stage slope 46b inclined at an angle α at the ending of the climbing over after the beginning-stage slope 46a, and wherein the relationship between the inclination angles is set to α<β.

In FIG. 7, the inclination angle γ of the sloping portion 53 in the guide pawl 52 of the top-end engagement hole 42 is set to α<β<γ relative to the inclination angles α and β. Because the guide pawl 52 at the top-end engagement hole 42 slopes upward and faces the engagement pawl 41, the sloping portion 53 is inclined in the same direction as that of the back face 46 of the engagement pawl 41. Because the inclination angle γ of this sloping portion 53 is set to α<β<γ relative to the angles β and α of the slopes 46a and 46b in the back face 46 of the engagement pawl 41, the sloping portion rises more steeply than the slopes 46a and 46b of the back face 46 of the engagement pawl 41. That is, the guide pawl 52 having the sloping portion 53 rises to be higher than the engagement pawl 41 toward the top end of the guide pawl 52, and therefore a gap is naturally generated between the sloping portion 53 and the back face 46 of the engagement pawl 41 toward the top end of the guide pawl 52.

Thus, the embodiment described above has a structure such that the inclination angle γ of the sloping portion 53 of the guide pawl 52 is made to be larger than the inclination angles α and β of the back face 46 of the engagement pawl 41, so that a gap is provided between the sloping portion 53 and the back face 46 of the engagement pawl 41. Therefore, if a clamping force F is applied to the band body 33 in the diameter-reducing direction, in the beginning of the clamping where the sloping portion 53 faces the beginning-stage slope 46a in the back face 46 of the engagement pawl 41, the top end of the sloping portion 53 (the right side in FIG. 7) does not contact the beginning-stage slope 46a, but the R part 56 at the root portion of the sloping portion 53 of the guide pawl 52 contacts the beginning-stage slope 46a. At this time, the sloping portion 53 of the guide pawl 52 smoothly climbs over and slides along the beginning-stage slope 46a by allowing the R part 56 at the root portion to contact the beginning-stage slope 46a, and therefore the sloping portion 53 does not get stuck with the beginning-stage slope 46a. Thus, the operations of clamping of the band body 33 at the beginning of clamping shown in FIG. 5(a)-FIG. 5(d) is performed more smoothly, thereby more surely preventing buckling from occurring in the area between the engagement pawl 41 and the second boot-band pawl 36 in the inner-layer portion 35.

Furthermore, in the case where the reaction force of a boot becomes larger at the ending of clamping of the band body 33, because the inclination angle γ of the sloping portion 53 is set to be larger than the inclination angle α (the angle at the ending of the climbing over) of the engagement pawl 41, the top end of the sloping portion 53 (the right side in FIG. 7) does not contact the ending-stage slope 46b. Also, because the inclination angle α of the ending-stage slope 46b (the angle at the ending of the climbing over) is set to be smaller than the inclination angle β of the beginning-stage slope 46a (the angle at the beginning of the climbing over), the contact pressure between the sloping portion 53 of the guide pawl 52 and the back face 46 is reduced, so that the friction force generated between them is diminished. Accordingly, even at the ending of the climbing over, after the sloping portion 53 has climbed over the ending-stage slope 46b, the sloping portion 53 can smoothly slide on the ending-stage slope 46b. Thus, the guide pawl 52 does not get stuck with the engagement pawl 41, and therefore no overload is applied to the area between the engagement pawl 41 and the second boot-band pawl 36 in the inner-layer portion 35. Thus, buckling is more surely prevented from occurring in the area between the engagement pawl 41 and the second boot-band pawl 36 in the inner-layer portion 35.

By providing the configuration shown in FIG. 7, all the steps of clamping, from the beginning stage to the ending stage, of the band body 33 shown in FIG. 5(a)-FIG. 5(d) are performed smoothly, and thereby even if the band body 33 is thinner, buckling is more surely prevented from occurring in the area between the engagement pawl 41 and the second boot-band pawl 36 in the inner-layer portion 35.

Embodiment 2

FIGS. 8 and 9 show a boot band 31A according to the Embodiment 2 of the present invention. In this boot band 31A, the guide means 51 is the inner surface 55 of the back end 42a of the top-end engagement hole 42, with the inner surface 55 opposite the engagement pawl 41. Embodiment 2 differs from Embodiment 1 in that in Embodiment 2 the sloping portion 53 is provided to this inner surface 55, and other component members of this embodiment are similar to those of Embodiment 1.

Also in the boot band 31A according to this embodiment, there are formed, in the lengthwise direction on the outer-layer portion 34, a top-end engagement hole 42 and a following engagement hole 43 behind the top-end engagement hole 42, which are opposite the engagement pawl 41 of the inner-layer portion 35. The inner surface 55 of the top-end engagement hole 42 is inclined so that the as to meet the slope of the back face 46 of the engagement pawl 41, and the sloping portion 53 is formed by press molding, coining, or the like so as to be inclined in the same direction as the back face 46. Also, an R part 57 (not shown in FIG. 8) is formed at the root portion, i.e., at the end (the left end in FIG. 8) of the sloping portion 53. The R part 57 is formed on the part that faces the inner-layer portion 34, at the back end 42a of the top-end engagement hole 42, and the sloping portion is formed so as to continue from this R part 57.

The inner surface 55 having the sloping portion 53 and the R part 57 in the top-end engagement hole 42 is a component of the guide means 51 of the present invention. That is, because the sloping portion 53 is formed so as to meet the back face 46 of the engagement pawl 41, and the R part 57 is formed at the root portion of the sloping portion 53, when the band body 33 is clamped in the diameter-reducing direction, the sloping portion 53 smoothly climbs over the back face 46 of the engagement pawl 41 due to the R part 57. Thus, the clamping of the band body 33 at the beginning of the clamping is smoothly performed, thereby more surely preventing buckling from occurring in the area between the engagement pawl 41 and the second boot-band pawl 36 in the inner-layer portion 35.

In the above described structure, if the band body 33 is further clamped in the diameter-reducing direction, the top-end engagement hole 42 climbs over the engagement pawl 41, and the sloping portion 53 that forms the inner surface 55 of the top-end engagement hole 42 extends along the back face 46 of the engagement pawl 41 while the sloping portion 53 climbs on and slides along the back face 46. Therefore, the outer-layer portion 34 does not get stuck with the back face 46 of the engagement pawl 41, and hence no overload is applied to the area between the engagement pawl 41 and the second boot-band pawl 36 in the inner-layer portion 35. Accordingly, as is the case in Embodiment 1, even if the band body 33 is made thinner, buckling is prevented from occurring in the area between the engagement pawl 41 and the second boot-band pawl 36 in the inner-layer portion 35.

Also, in this embodiment, as is explained with reference to FIG. 6, the back face 46 of the engagement pawl 41 can be configured to have two stages, including a beginning-stage slope 46a and an ending-stage slope 46b, and the relationship between the inclination angle β of the beginning-stage slope 46a and the inclination angle α of the ending-stage slope 46b can be set to be α<β. Setting the angles in that way makes it possible to reduce the contact pressure and friction force—between the ending-stage slope 46b of the engagement pawl 41 and the sloping portion 53—generated by the reaction force of a boot at the ending of the climbing over the back face 46, as is explained with reference to FIG. 6. Therefore, when the top-end engagement hole 42 moves on the back face 46 of the engagement pawl 41 due to the clamping of the band body 33 in the diameter-reducing direction, the engagement hole 42 can be moved more smoothly in all the steps from the beginning to the ending of the climbing over the back face 46 of the engagement pawl 41. Thus, because the outer-layer portion 34 does not get stuck with the engagement pawl 41, no overload is applied to the area between the engagement pawl 41 and the second boot-band pawl 36 in the inner-layer portion 35 of the band body 33, even if the band body 33 is made thinner.

Also, in this embodiment, as is explained with reference to FIG. 7, the inclination angle γ of the sloping portion 53 forming the inner surface 55 of the top-end engagement hole 42 can be set to α<β<γ relative to the inclination angles α and β. Because, as described above, the inclination angle γ of this sloping portion 53 is allowed to be larger than the angles β and α of the slopes 46a and 46b in the back face 46 of the engagement pawl 41, the sloping portion 53 rises more steeply than do the slopes 46a and 46b of the back face 46 of the engagement pawl 41. Thus, a gap is naturally generated between the sloping portion 53 of the inner surface 55 of the top-end engagement hole 42 and the back face 46 of the engagement pawl 41 toward the top end of the guide means 51. Accordingly, the top end of the inner surface 55 of the top-end engagement hole 42 (the right end shown in FIG. 8) does not contact the engagement pawl 41 at either the beginning or ending stages of the clamping of the band body 33 in the diameter-reducing direction. Also, at the beginning of clamping, the R part 57 of the root portion of the sloping portion 53 contacts the beginning-stage slope 46a of the engagement pawl 41. At this time, the sloping portion 53 smoothly slides along and climbs over the beginning-stage slope 46a by allowing the R part 57 at the root portion to contact the beginning-stage slope 46a, and therefore the sloping portion 53 does not get stuck with the engagement pawl 41, whereby no overload is applied to the area between the engagement pawl 41 and the second boot-band pawl 36 in the inner-layer portion 35.

Also, at the ending of clamping, the contact pressure between the sloping portion 53 and the back face 46 of the engagement pawl 41 can be reduced, and the friction force generated between them can also be reduced. Accordingly, because the sloping portion 53 can smoothly slide on the ending-stage slope 46b under the condition where the sloping portion 53 has climbed over the ending-stage slope 46b, the sloping portion 53 does not get stuck with the engagement pawl 41, and no overload is applied to the area between the engagement pawl 41 and the second boot-band pawl 36 in the inner-layer portion 35. Thus, while the clamping of the band body 33 is proceeding from beginning to end, buckling is more surely prevented from occurring in the area between the engagement pawl 41 and the second boot-band pawl 36 in the inner-layer portion 35, even if the band body 33 is made to be thinner.

FIGS. 10 and 11 show a modified embodiment of Embodiment 2. In this embodiment, the guide means 51 includes the R part 57 that is provided to a part of the inner surface 55 of the back end 42a [Kyosei's Note: The author of this specification mistakenly failed to show the back end 42a in either FIG. 10 or FIG. 11.] and that is formed by press molding, coining, or the like, the part facing the inner-layer portion 35, in which the inner surface 55 is opposite the engagement pawl 41. This embodiment differs from the embodiment shown in FIGS. 8 and 9, although other component members of this embodiment are similar to those of the primary Embodiment 2. The R part 57 of this embodiment is formed at the root portion of the back end 42a of the top-end engagement hole 42, and is provided with a straight portion 58 in a continuous manner.

Also in this embodiment, when the inner surface 55 of the top-end engagement hole 42 contacts the beginning-stage slope 46a of the engagement pawl 41 at the beginning of clamping, the inner surface 55 climbs over and slides along the beginning-stage slope 46a by allowing the R part 57 to contact the beginning-stage slope 46a, and therefore the inner surface 55 does not get stuck with the engagement pawl 41, and no overload is applied to the area between the engagement pawl 41 and the second boot-band pawl 36 in the inner-layer portion 35.

Also, in this embodiment, when the band body 33 is clamped and the top-end engagement hole 42 is moved over the back face 46 of the engagement pawl 41, the outer-layer portion 34 does not get stuck with the engagement pawl 41, and the band body 33 is smoothly reduced in diameter. Therefore, no overload is applied to the area between the engagement pawl 41 and the second boot-band pawl 36 in the inner-layer portion 35, and even if the band body 33 is made thinner, buckling is prevented from occurring in the area between the engagement pawl 41 and the second boot-band pawl 36 in the inner-layer portion 35.

Also in the Embodiment 2 shown in FIGS. 8-11, a planar terminal end 38 is formed at the top end of the outer-layer portion 34, and an opening 36b and a pressing part 36a of the second boot-band pawl 36 are formed on the inner-layer portion 35. Thus, when the band body 33 is clamped, the terminal end 38 is pressed by the pressing part 36a of the second boot-band pawl 36, so that the outer-layer portion 34 is prevented from rising. Accordingly, pressing the outer-layer portion 4 inward is not necessary when the band body 33 is clamped. Therefore, simply clamping of the band body 33 in the diameter-reducing direction achieves the clamping of the member to be clamped, so that clamping is performed by one action, and clamping workability is improved.

LIST OF ALPHANUMERIC CHARACTERS USED IN THIS SPECIFICATION AND THE FIGURES

31 boot band
33 band body
34 outer-layer portion
35 inner-layer portion
36 second boot-band pawl
36a opening
36b pressing part
37 second boot-band pawl
38 terminal end
41 engagement pawl
42 top-end engagement hole
42a back end
43 following engagement hole
46 back face
51 guide means
52 guide pawl
53 slope
55 inner surface
56, 57 R part

The invention claimed is:

1. A boot band comprising:
a band body that is wound, for clamping in a ring-like form around a member to be clamped, in such a way that an outer-layer portion overlaps an inner-layer portion;
a first boot-band pawl that is formed on a top end side of the outer-layer portion:
a planar terminal end portion formed in the outer-layer portion, and that is located nearer to the top end of the outer-layer portion than the first boot-band pawl;
a second boot-band pawl formed in the inner-layer portion, that has an opening into which the terminal end portion can be inserted, and a pressing part that presses, from the outside, the terminal end portion that is inserted into the opening, and that clamps the band body together with the first boot-band pawl so that the band body is reduced in diameter;
a plurality of engagement holes formed along the lengthwise direction in the outer-layer portion;
an engagement pawl formed on the inner-layer portion, and that rises in a slope-like form facing the top end side of the outer-layer portion,
wherein in a state where the engagement pawl is inserted into a top-end side engagement hole that is located at the top end side of the outer-layer portion in the lengthwise direction, clamping force is applied to the band body in the diameter-reducing direction, so that the top-end side engagement hole is moved over the engagement pawl, whereby a following engagement hole is engaged with the engagement pawl;
a guide means disposed at a back end portion of the top-end side engagement hole, with the guide means being opposite the engagement pawl, wherein the guide means has a slope portion along the engagement pawl, and
wherein the clamping force in the diameter-reducing direction allows the guide means to climb over the back face of the engagement pawl, and
wherein the slope of the back face of the engagement pawl is formed to include two stages of angles, an inclination angle $\beta$ at the beginning of the climbing over and an inclination angle $\alpha$ at the end of the climbing over, and the slope portion of the guide means has an inclination angle of $\gamma$, and the relationship between $\alpha$, $\beta$, and $\gamma$ being $\alpha<\beta<\gamma$.

2. The boot band according to claim 1, wherein the guide means is a round-portion provided at the inner-layer portion side in the back end portion of the top-end side engagement hole.

3. The boot band according to claim 1, wherein the guide means is a guide pawl that rises with a slope from the back end portion of the top-end side engagement hole in the direction in which the engagement pawl rises, and the slope portion is provided at an opposing surface of the guide pawl, with the opposing surface being opposite the engagement pawl.

4. The boot band according to claim 1, wherein the guide means is an inner surface of the back end portion in the top-end side engagement hole, with the back end portion being opposite the engagement pawl, and the slope portion is provided at the inner surface of the back end portion.

* * * * *